H. F. BRENEMAN.
Car Coupling.

No. 93,407.  
Patented Aug. 10, 1869.

Witnesses  
B. D. Damun  
George Long

Inventor:  
Henry F. Breneman

United States Patent Office.

HENRY F. BRENEMAN, OF RAPHO TOWNSHIP, ASSIGNOR TO HIMSELF AND MARTIN L. GREIDER, OF LANCASTER COUNTY, PENNSYLVANIA.

Letters Patent No. 93,407, dated August 10, 1869.

IMPROVED RAILWAY-CAR COUPLING.

The Schedule referred to in these Letters Patent and making part of the same.

*To all whom it may concern:*

Be it known that I, HENRY F. BRENEMAN, of Rapho township, in the county of Lancaster, and State of Pennsylvania, have invented a new and improved Device for Coupling Railroad-Cars; and I do hereby declare that the following is a full, clear, and exact description of the construction and operation of the same, reference being had to the accompanying drawings, making a part of this specification, in which—

Figure 1:
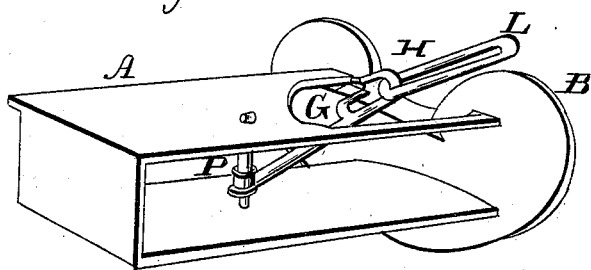
Figure 1 is a perspective view.
Figure 2:
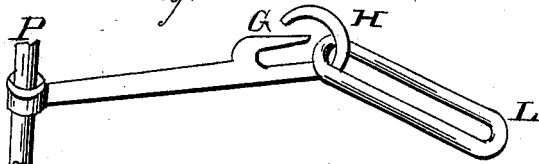
Figure 2 shows the hook, and link, and hinged connection or pivot.
Figure 3:
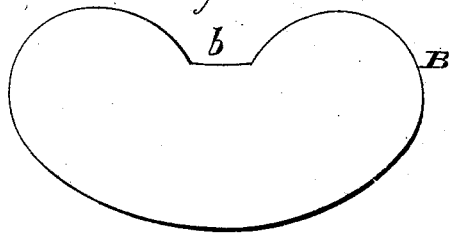

Figure 3, the shield or bumper.

The object of my invention is to facilitate coupling cars, without a bolt or springs, by means of a vibrating hook, guard, and link, protected by a shield, and encased in a box with an opening in the top, for unshifting or uncoupling without exposing the hands, or otherwise incurring risk of injury in doing so.

To enable others skilled in the art to make and use my invention, a few words will suffice, in connection with the drawings, which clearly show the open case A, shield or bumper B, pivot P, hook and guard H G, and link L.

This metallic case and bumper may be cast in a single piece, the central pivot P, to which the stem of the hook is hinged, so as to allow it both vertical and lateral play, and also to adapt it to cars varying in height.

This hook H turns inward, the lower rounded portion resting and sliding on the thickened inner lip, inside the notch b.

In the upper portion of the shield or bumper B, back of the hook H, is a guard-hook, G, to confine the action of the link L, when slipped over the hook, and through the open space between the hook and guard, which latter prevents the link from becoming disconnected, however jerked back and forth by the motion of the cars.

The upper forward portion or top of the case A has a large opening behind the shield, by which free and easy access is had to the link, to uncouple. For coupling, the link is simply dropped over the hook upon the guard, and will find its proper position by slipping through and below the guard.

I am aware that a simple rigid hook on the end of the car is old; and, also, that Patent No. 60,741 is for such a rigid hook and guard combined, and claiming a wrought-iron hook, provided with a prong, (equivalent to my guard,) arranged to act upon the coupling, as described.

This arrangement lacks the element of adaptation to cars of unequal height, as is so frequently the case, and the form of the hook and prong is defective, also; and the use of several links instead of one is necessary; and, being unprotected by a bumper or shield, is liable to being broken off, or damaging the adjoining or connected car.

I, therefore, do not claim a hook and guard simply, when rigidly attached; nor do I claim the case and shield, separately considered, as such are common, though usually open or bell-mouthed to receive the link; but

What I claim, and desire to secure by Letters Patent, as my invention, is—

The combination and arrangement of a vibrating and adjustable hook-stem, on a pivot, P, within a case, A, said stem terminated by a hook-end, H, and open guard, G, resting on the rounded, notched lip of the shield or bumper B, all constructed and operating substantially as and for the purpose specified.

HENRY F. BRENEMAN.

Witnesses:
B. D. DANNER,
GEORGE LONG.